United States Patent [19]

Cummings et al.

[11] Patent Number: 5,453,158
[45] Date of Patent: Sep. 26, 1995

[54] POLYMER DEVOLATILIZER

[75] Inventors: Clark J. Cummings; Bernard J. Meister, both of Midland, Mich.

[73] Assignee: The Dow Chemical Company, Midland, Mich.

[21] Appl. No.: 209,021

[22] Filed: Mar. 10, 1994

[51] Int. Cl.⁶ .............................. B01D 1/00; B01D 3/06; F28F 13/00
[52] U.S. Cl. .................... 159/47.1; 159/2.1; 159/28.6; 159/DIG. 10; 165/146; 165/147; 165/167; 203/88; 523/324; 523/340; 528/501
[58] Field of Search ................... 159/47.1, 28.6, 159/DIG. 10, 13.2, 2.1; 165/166, 167, 146, 147; 523/324, 340; 528/501; 203/88

[56] References Cited

U.S. PATENT DOCUMENTS

| | | | |
|---|---|---|---|
| 3,014,702 | 12/1961 | Oldershar et al. | 165/158 |
| 3,155,565 | 11/1964 | Goodman | 159/28.6 |
| 3,724,522 | 4/1973 | Pogson | 159/28.6 |
| 3,844,329 | 10/1974 | Burke, Jr. | 159/28.6 |
| 4,153,501 | 5/1979 | Fink et al. | 159/49 |
| 4,421,162 | 12/1983 | Tollar | 165/166 |
| 4,423,767 | 1/1984 | Hay, II et al. | 165/166 |
| 4,564,063 | 1/1986 | Tollar | 165/165 |
| 4,586,565 | 5/1986 | Hallstrom et al. | 159/28.6 |
| 4,704,431 | 11/1987 | Stuart et al. | 525/70 |
| 4,808,262 | 2/1989 | Aneja et al. | 159/47.1 |
| 5,084,134 | 1/1992 | Mattiussi et al. | 159/47.1 |

OTHER PUBLICATIONS

AIChE Jor., "*Slit Devolatilization of Polymers*" vol. 37, pp. 724–734, May, 1991 Maffettone, et al.

*Primary Examiner*—Virginia Manoharan
*Attorney, Agent, or Firm*—Lynn M. Zettler

[57] ABSTRACT

An improved polymer devolatilization apparatus including a flat plate heater having a multiplicity of flat plates defining a plurality of channels, each channel having a substantially uniform height but varying width over its length, each channel including three zones:

- a first zone in operative communication with the polymer solution supply device, characterized by decreasing width as a function of distance from its beginning,
- a second zone beginning at the terminus of the first zone, characterized by at least one occurrence of a restrictive cross-sectional area, and
- a third zone beginning at the end of the second zone and terminating at a liquid/vapor collection and separation region operating at reduced pressure, said third zone characterized by increasing width as a function of distance from its beginning, and provided further that the ratio of maximum width of the third zone to the maximum width of the second zone is from 2:1 to 20:1.

6 Claims, 2 Drawing Sheets

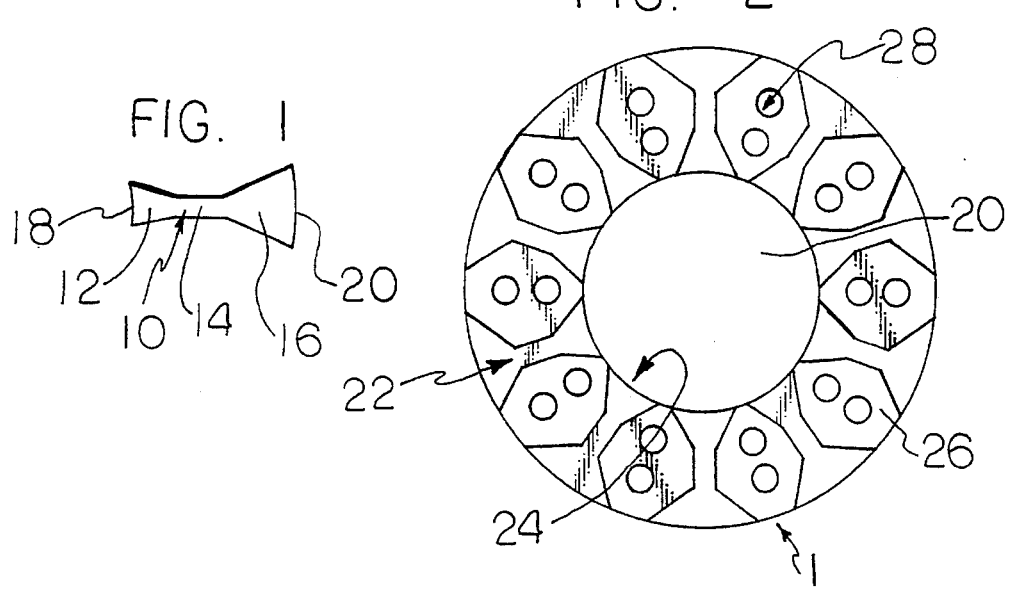
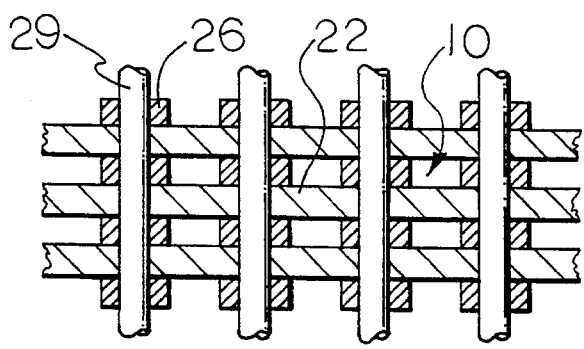
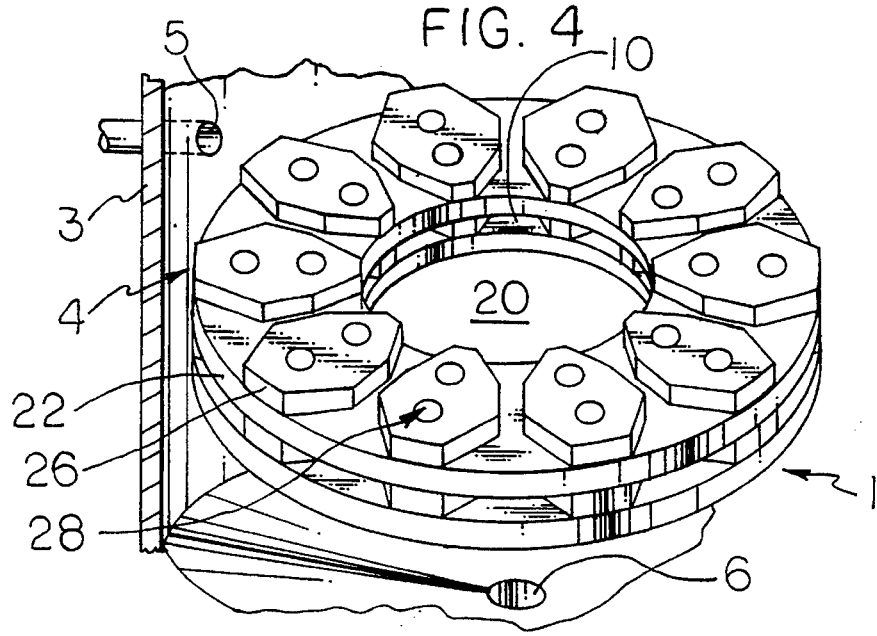

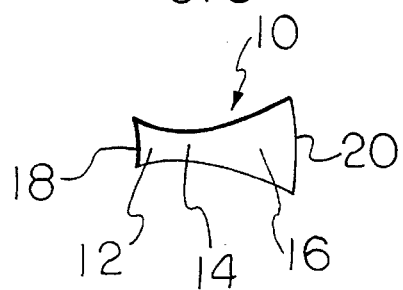
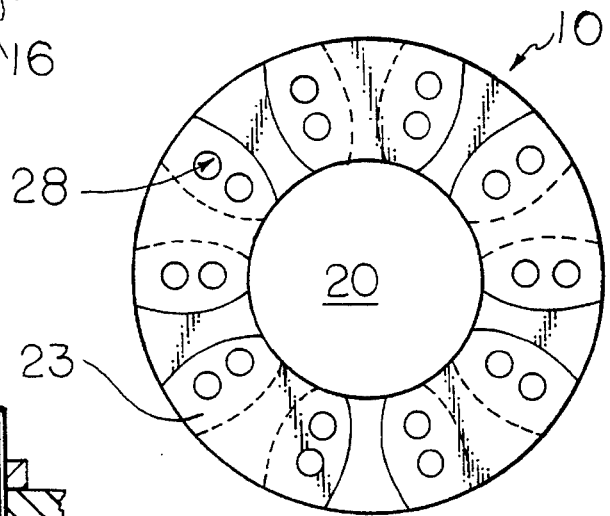
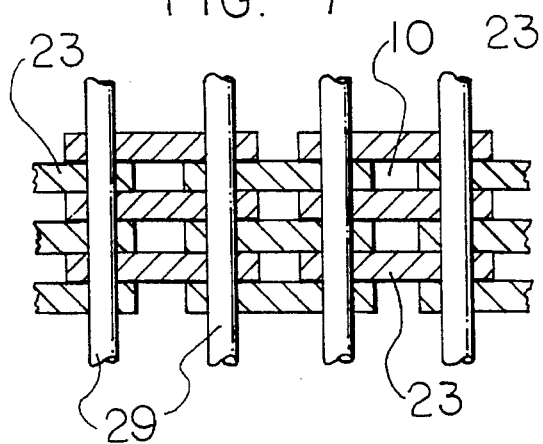
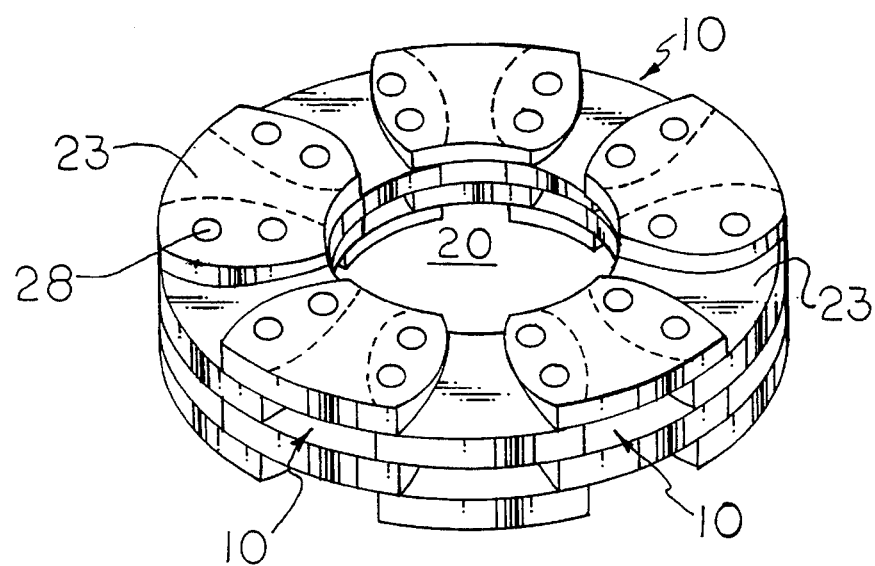

POLYMER DEVOLATILIZER

BACKGROUND OF THE INVENTION

This invention relates to a polymer devolatilization apparatus comprising a flat plate heat exchanger and a related process for the devolatilization of polymer solutions at relatively high product flow rates.

The removal of volatile components from a polymer solution, referred to as "devolatilization", is a necessary step in the commercial manufacture of many polymers. In particular, where a polymer is produced from a solution of monomers, it is necessary to remove the solvent and unreacted monomers from the final product. For example, residual monomer and volatiles must be removed from the polymer product in the bulk or solution polymerization of polystyrene, styrene/acrylonitrile copolymers (SAN) or rubber modified styrene/acrylonitrile copolymers (ABS, AES, etc.).

The separation of the volatile components from the polymer is generally achieved by evaporation, the process consisting of heating the polymer solution at a temperature higher than its boiling point and removing the vapors formed. One method of devolatilization involves passing the polymer solution through a heat exchanger and then into a zone of reduced pressure. Suitable heat exchangers for this purpose, referred to as flat plate heaters or flat plate heat exchangers comprise a multiplicity of heated flat plates arranged in layers to leave channels connecting the interior to which a polymer solution is supplied and exterior portions of the heater for passage of the solution to be heated and devolatilized. Improved performance is attained by placing the heater within a closed shell which is partially evacuated. Previous designs of flat plate heaters have been disclosed in U.S. Pat. Nos. 3,014,702, 4,153,501, 4,421,162, 4,423,767, 4,564,063, 4,808,262, and 5,084,134, the teachings of which are hereby incorporated by reference.

More efficient designs of flat plate heaters use extended length channels and operate at lower temperatures which tend to improve the distribution of polymer solution through the heating channels. However, the use of channels longer than about 152 mm or 6 inches, can result in flow instability, particularly when polystyrene, SAN, ABS or AES polymer solutions are devolatilized. Flow instability has been shown to be a function of the flow rate of the polymer through the heated channels, and can be detected by the presence of pressure oscillations at the entrance of the channels. The magnitude of these oscillations becomes larger as the flow rate increases. Observations of such flow instability have been made by Maffetone, et al., "Slit Devolatilization of Polymers" *AIChE Journal*, 37, 724–34 (May 1991).

It would be desirable if there were provided an improved polymer devolatilization apparatus incorporating a flat plate heat exchanger having an improved heating channel design, which would allow high product flow rates, without the occurrence of significant pressure oscillations which cause flow instability.

SUMMARY OF THE INVENTION

According to the present invention there is provided an improved polymer devolatilization apparatus comprising a flat plate heater comprising a polymer solution supply means, and a liquid/vapor collection and separation means, said flat plate heater further comprising a multiplicity of flat plates defining a plurality of channels, each channel having a substantially uniform height but varying width over its length, each channel comprising three zones:

a first zone in operative communication with the polymer solution supply means, characterized by decreasing width as a function of distance from its beginning, a second zone beginning at the terminus of the first zone, characterized by at least one occurrence of a restrictive cross-sectional area, and a third zone beginning at the end of the second zone and terminating at a liquid/vapor collection and separation region capable of operating at reduced pressure, said third zone characterized by increasing width as a function of distance from its beginning, and provided further that the ratio of maximum width of the third zone to the maximum width of the second zone is from 2:1 to 20:1.

Also claimed is a process for the devolatilization of polymer solutions comprising feeding a polymer solution to a polymer devolatilization apparatus comprising a flat plate heater as hereinbefore described operating under polymer devolatilization conditions so as to separate the volatile components of the polymer solution from the devolatilized polymer.

BRIEF DESCRIPTION OF THE DRAWINGS

For a better understanding of the invention, reference may be had to the accompanying drawings in which:

FIG. 1 depicts a single heating channel of one embodiment of the flat plate heater of the present invention.

FIG. 2 is an axial view of a cylindrically shaped flat plate heater incorporating the channel design of FIG. 1.

FIG. 3 is a side view of the flat plate heater of the present invention incorporating the plate design of FIG. 2.

FIG. 4 is an oblique view of the flat plate heater of the present invention incorporating the plate design of FIG. 2.

FIG. 5 depicts a single heating channel of an alternative embodiment of the flat plat heater of the present invention.

FIG. 6 is an axial view of a cylindrically shaped flat plate heater incorporating the channel design of FIG. 5 and having an alternative plate configuration from that of FIG. 2.

FIG. 7 is a side view of the flat plate heater of the present invention incorporating the plate design of FIG. 5 and the plate configuration of FIG. 6.

FIG. 8 is an oblique view of the flat plate heater of the present invention having the channel design of FIG. 5 and the plate configuration of FIG. 6.

DETAILED DESCRIPTION OF THE INVENTION

Suitable polymers the solutions of which may be devolatilized according to the present invention include any polymeric product typically produced in a solution process or any other polymer containing entrained volatile components. Examples include olefin polymers, vinylaromatic polymers, condensation polymers, etc. Preferred are vinylaromatic polymers. For the purpose of the present invention, vinylaromatic polymers are to be understood as being all homopolymers and copolymers (including graft copolymers) of one or more vinylaromatic monomers and blends thereof with additional polymers. Examples of such polymers include polystyrene, rubber modified or impact-resistant polystyrene, styrene/acrylonitrile copolymers (including rubber modified versions thereof, ie. ABS or AES copolymers), and blends of the foregoing with other polymers such as polycarbonate or polyphenylene ether polymers. Preferred vinylaromatic polymers are polystyrene, impact modified polystyrene (HIPS) and ABS. The above polymers may exist as solutions with large or small amounts of volatile components. Typical solvents include aromatic or aliphatic inert diluents as well as unreacted monomers. The amount of solvent to be devolatilized may range from a large excess to a mere contaminating amount, typically amounts of volatile components to be removed range from 2:1 to 0.001:1 based on polymer weight.

The devolatilization apparatus of the present invention includes the improved heat exchanger which allows higher flow rates of polymer solutions without pressure oscillations thereby increasing the throughput and efficiency of the heat exchanger. The flat plates may be made of any suitable material but preferably are of steel, stainless steel, or aluminum.

In FIG. 1, there is depicted the shape of a heating channel (10) in a flat plate heater in accordance with one embodiment of the present invention. The heating channel comprises three zones, a first generally converging zone (12) which is wider at its entrance than its exit, a second, restrictive zone (14) wherein the channel achieves a minimum width sufficient to cause a pressure drop across the restrictive zone, thereby preventing substantial flashing of the volatile components while in the first zone; and a third generally diverging zone (16) designed to allow flashing of the polymer solution due to decrease in pressure. The overall length of the heating channel is typically from 15.0 to 50.0 cm, more preferably from 16 to 30 cm.

The first zone has an opening (18) into which the polymer solution enters the heating channel. The length of the first zone is from 5 to 20% of the total length of the heating channel and the width at the opening (18) is from 1.0 to 5.0 cm. The ratio of the width of the widest point of the first zone to the width of the narrowest point of the zone varies from 1.5:1 to 10:1. The first zone preferably includes sufficient surface area in contact with the polymer solution to raise the temperature of the polymer solution to the ultimate devolatilization temperature, however, because the pressure of the polymer solution in the first zone is not reduced (due to the presence of the restrictive zone interposed between the zone of reduced pressure and the polymer supply means) flashing is substantially eliminated from the first zone of the flat plate heater. Because of this fact, solution flow is controlled and orderly. Alternating filling of the channels and expulsion, due to rapid flashing is substantially eliminated. Consequently, more uniform polymer devolatilization is achieved and pressure oscillations and surging of the devolatilizer are eliminated.

The second zone (14) begins at the terminus of the first zone and varies in length from about 1.0% to 40% of the total length of the channel connecting with the entrance of the third zone. The width of the second zone may remain constant for its entire length, decrease to a minimum and then remain constant or decrease to a minimum and thereafter increase again. Preferably at its narrowest point the second zone is between about 0.25 and 2.0 cm wide, more preferably between 0.5 and 1.0 cm wide. The ratio of the width of the widest point of the zone to the width of the narrowest point of the zone is preferably from 1.0:1 to 1.5:1. Also preferably, the ratio of the widest width of the first zone to the narrowest width of the second zone is greater than 2:1, and preferably greater than 3:1.

The third zone (16) begins at the terminus of the second zone and terminates with an exit (20) for discharge of the polymer solution (which at this point is substantially devolatilized and comprises molten polymer containing entrained bubbles of devolatilized solvent or monomer). The length of the third zone is from about 40 to 85% of the total length of the channel. The ratio of the width of the third zone at its terminus to that at its entrance is preferably from 1.75:1 to 10:1. The width of the zone need not be constantly increasing from entrance to terminus but may follow a sinusoidal or other curved shape. Also preferably, the ratio of the maximum width of the third zone to the minimum width of the restrictive zone is greater than 2:1.

In FIG. 2, there is provided a view along the axis of a flat plate heater (1) of cylindrical shape. The flat plate heater comprises a multiplicity of flat plates (22) in the shape of disks stacked in alternating layers with blocks (26) of an appropriate shape and arranged so as to define the outside dimension of each channel and secured so as to define a central chamber (24) for receiving the polymer solution to be devolatilized from the polymer supply means. Around the central chamber the flat plates are arranged so as to define the heating channels which extend radially to the periphery of the flat plate heater. The number of channels in the flat plate heater may vary from as few as 8 to several thousands. In each block are holes (28) through which the heating medium passes, optionally by means of a conduit or pipe (29) (not depicted) which also secures the plates (22) against movement.

FIG. 3 shows a side view of the flat plate heater of FIG. 2 showing the arrangement of conduits or pipes (29) and alternating layers of disks (22) and blocks (26) resulting in the formation of channels (10) in this embodiment of the invention.

FIG. 4 shows an oblique cut-away view of the polymer devolatilizer containing the flat plate heater (2) as previously described. The heater is located within a shell (5). Between the shell and the flat plate heater is a region of reduced pressure (4) in operative communication with a means to remove volatile components, such as a condenser, not shown, connected to a vapor exit (5) and a polymer discharge means, such as a pump, not shown, connected to a polymer exit (6).

FIG. 5 depicts an alternative design of the heating channel (10) having a curved shape and gradual transition between the three zones, (12), (14) and (16). Entrance (18) and exit (20) are also depicted.

FIG. 6 shows a top view of an alternative embodiment of the flat plate heater wherein the channels are formed by alternating layers of symmetrically shaped plates, (23), spaced apart from adjacent plates in the same layer so as to form channels (10) having a curved shape as illustrated in FIG. 5. The plates are held in place by conduits or pipes (29) (not shown) located in multiple holes (28) passing through the plates. Preferably, the plates (23) are all substantially identical in shape and size.

FIG. 7 shows a side view of the flat plate heater of FIG. 6 showing the arrangement of conduits or pipes (29) and alternating layers of symmetrically shaped plates (23) defining channels (10).

FIG. 8 shows an oblique view of the alternating layers of symmetrically shaped plates, (23) of the flat plate heater according to FIG. 6 or 7, showing the holes (28) and channels (10).

In operation, heat exchange fluid, at the appropriate temperature, is pumped through the conduits (29) within holes (28), heating the stacked plates (23). Polymer solution from the polymer solution supply means (not shown) fills the central chamber (20), enters the opening (18) of the heating channels (10), and flows outward to exit into the region of reduced pressure (4). The volatile components are caused to be released through foaming of the solution which preferably takes place within the third zone of the heating channels. The devolatilized polymer, preferably in a molten state, is collected (for example by gravity flow) and discharged through the polymer discharge means (not shown). Complete polymer devolatilization may require the use of more than one heat exchanger operating in series to reduce the content of volatile material in the polymer in two or more steps.

While the illustrated embodiments indicate that each channel (10) has a rectangular cross section it is understood that the edges could equally be rounded. For example, in order to avoid sharp corners in the channels the edges could join the top and bottom of the channel with a radius. Preferred channels possess a constant height over the entire length thereof of from 0.1 cm to 1.0 cm, more preferably from 0.2 to 0.5 cm.

EXAMPLE

The following example is provided to better illustrate this invention, but without limiting the same.

In the following runs, a polymer solution containing 85% polystyrene (Mw=250,000), 8% styrene and 7% ethylbenzene at a temperature of 130° C. was pumped at various pumping rates through devolatilizers comprising flat plate heaters of different designs. All heaters had the same height and number of channels but varied in channel geometry. The devolatilizers operated at a reduced pressure of 5 Torr in the region of reduced pressure. To measure any pressure oscillations within the polymer supply means that occurred during the devolatilization process the pressure at the entrance of the heating channels was monitored by means of a transducer. Various channel geometries were evaluated for polymer solution flow stability at different flow rates. All runs achieved a reduction of volatile components to less than 1 percent by weight.

Run 1

A flat plate heater having rectangular cross section channels with a length of 15.25 cm, height of 0.254 cm and a constant width of 2.54 cm was evaluated over a range of polymer solution flow rates. The results of this experiment are summarized in Table 1.

TABLE 1

| Flow Rate (kg/hr/channel) | mean pressure (kPa) | Magnitude of oscillations (kPa) |
|---|---|---|
| 0.464 | 213 | 0 |
| 0.636 | 270 | 0 |
| 0.755 | 274 | 0 |

It may be seen that at this length of channel no significant problem of flow instability is observed over the range of flow rates tested.

Run 2

The experimental conditions of Run 1 were repeated excepting that the heating channel had an increased length of 17.78 cm and constant width of 2.54 cm. The results of this experiment are shown in Table 2.

TABLE 2

| Flow Rate (kg/hr/channel) | mean pressure (kPa) | Magnitude of oscillations (kPa) |
|---|---|---|
| 0.142 | 130 | 0 |
| 0.281 | 186 | 41 |
| 0.380 | 199 | 69 |

It may be seen that with the increase in channel length, onset of pressure oscillations occurs even at reduced polymer solution pumping rates.

Run 3

The experimental conditions of Runs 1 and 2 are repeated excepting that the heating channel had an increased length of 22.86 cm and constant width of 2.54 cm. The results of this experiment are shown in Table 3.

TABLE 3

| Flow Rate (kg/hr/channel) | mean pressure (kPa) | Magnitude of oscillations (kPa) |
|---|---|---|
| 0.140 | 103 | 0 |
| 0.367 | 254 | 137 |
| 0.448 | 268 | 82 |

Significant pressure oscillations occur at the higher flow rates tested using this length of heating channel.

Run 4

A run illustrating the present invention was conducted in the following manner. The experimental conditions of runs 1–3 are repeated excepting that the heating channel design was modified to comprise three zones, a first zone of decreasing width having a length of 2.54 cm, a maximum width at the opening of 2.54 cm, and a width at the terminus of 0.953 cm; a second restrictive zone connected to the end of the first zone having a length of 5.08 cm and a constant width of 0.953 cm; and a third zone connected to the end of the second zone having a length of 11.43 cm, gradually and constantly increasing in width from 0.953 cm at the beginning to a maximum width of 2.54 cm at the terminus thereof. The height of the channels was 0.254 cm. Overall length of the channel was 19.05 cm. The results of this experiment are shown in Table 4.

TABLE 4

| Flow Rate (kg/hr/channel) | mean pressure (kPa) | Magnitude of oscillations (kPa) |
|---|---|---|
| 0.556 | 405 | 0 |
| 0.658 | 426 | 0 |
| 0.817 | 481 | 0 |

This channel design shows increased stability, particularly at elevated polymer solution flow rates.

As is apparent from the foregoing specification, the present invention is susceptible of being embodied with various alterations and modifications which may differ particularly from those that have been described in the preceding specification and description. For this reason, it is to be fully understood that all of the foregoing is intended merely to be illustrative and is not to be construed or interpreted as being restrictive or otherwise limiting of the present invention, excepting as it is set forth and defined in the following claims.

What is claimed is:

1. An improved polymer devolatilization apparatus comprising a flat plate heater comprising a polymer solution supply means, and a liquid/vapor collection and separation means, said flat plate heater further comprising a multiplicity of flat plates defining a plurality of channels, each channel having a substantially uniform height but varying width over its length, each channel having a total channel length of 16 to 30 cm divided into three zones:

a first, converging zone having a beginning and a terminus, said beginning in operative communication with the polymer solution supply means, characterized by decreasing width as a function of distance from its beginning, a second, restrictive zone wherein the channel achieves minimum width sufficient to cause a pressure drop across the restrictive zone, having a beginning at the terminus of the first zone, and a terminus characterized by at least one occurrence of a restrictive cross-sectional area, and a third, diverging zone having a beginning at the terminus of the second zone and terminating at a liquid/vapor collection and separation region operating at reduced pressure, said third zone characterized by increasing width as a function of distance from its beginning, and provided further that the ratio of maximum width of the third zone to the maximum width of the second zone is from 2:1 to 20:1;

wherein the ratio of the width of the first converging zone at the beginning to the width at the terminus is from 1.5:1 to 10:1; the width of the second zone remains unchanged; and the ratio of the width of the third zone at the terminus to the width at the beginning is from 1.75:1 to 10:1.

2. The apparatus of claim 1 wherein the first zone has a length of from 5 to 20% of the total channel length, the second zone has a length of from 1% to 40% of the total channel length and the third zone has a length of from 40% to 85% of the total channel length.

3. An improved polymer devolatilization process for the devolatilization of polymer solutions comprising feeding a polymer solution containing entrained volatile components to a polymer devolatilization apparatus which comprises a flat plate heater having a polymer solution supply means, and a liquid/vapor collection and separation means, said flat plate heater further comprising a multiplicity of flat plates defining a plurality of channels, each channel having a substantially uniform height but varying width over its length, each channel having a total channel length of 16 to 30 cm divided into three zones:

a first, converging zone, having a beginning and a terminus, said beginning in operative communication with the polymer solution supply means, characterized by decreasing width as a function of distance from its beginning, a second, restrictive zone, wherein the channel achieves minimum width sufficient to cause a pressure drop across the restrictive zone, having a beginning at the terminus of the first zone, and a terminus, characterized by at least one occurrence of a restrictive cross-sectional area, and a third, diverging zone having a beginning at the terminus or the second zone and terminating at a liquid/vapor collection and separation region operating at reduced pressure, said third zone characterized by increasing width as a function of distance from its beginning, and provided further that the ratio of maximum width of the third zone to the maximum width of the second zone is from 2:1 to 20:1;

passing the polymer solution through the channels while heating, evaporating the volatile components, removing the vapors formed, and separating them from the devolatilized polymer.

4. The process of claim 3 wherein the first zone has a length of from 5 to 20% of the total channel length, the second zone has a length of from 1% to 40% of the total channel length and the third zone has a length of from 40% to 85% of the total channel length.

5. The process of claim 3 wherein the ratio of the width of the first zone at the beginning to the width at the terminus is from 1.5:1 to 10:1; the width of the second zone remains unchanged; and the ratio of the width of the third zone at the terminus to the width at the beginning is from 1.75:1 to 10:1.

6. The process of claim 3 wherein the polymer is a vinylaromatic polymer.

* * * * *

UNITED STATES PATENT AND TRADEMARK OFFICE
CERTIFICATE OF CORRECTION

PATENT NO. : 5,453,158
DATED : September 26, 1996
INVENTOR(S) : Clark J. Cummings et al.

It is certified that error appears in the above-indentified patent and that said Letters Patent is hereby corrected as shown below:

Claim 3, column 8, line 23, "or" should correctly read --of--.

Signed and Sealed this

Twenty-seventh Day of August, 1996

Attest:

BRUCE LEHMAN

Attesting Officer

Commissioner of Patents and Trademarks